United States Patent [19] [11] 3,993,892
Haug [45] Nov. 23, 1976

[54] DEVICE FOR TRANSMITTING INFORMATION IN THE FORM OF ELECTRICAL SIGNALS TO AT LEAST ONE MECHANISM FOR DISPLAYING OR PRINTING THIS INFORMATION

[76] Inventor: Werner Haug, Kreuzstrasse 42, Langnau, Switzerland

[22] Filed: Nov. 3, 1975

[21] Appl. No.: 628,245

[30] Foreign Application Priority Data
Dec. 10, 1974 Switzerland.................... 16397/74

[52] U.S. Cl. ..................... 235/61 PG; 235/61 PH; 235/58 P; 235/60 P
[51] Int. Cl.² ..................... G06C 29/00; G06K 3/00
[58] Field of Search ........ 235/61 PG, 61 PH, 61 PJ, 235/61 PL, 58 P, 60 P

[56] References Cited
UNITED STATES PATENTS

| | | | |
|---|---|---|---|
| 3,142,441 | 7/1964 | Edwards | 235/60 P |
| 3,295,757 | 1/1967 | Busch et al. | 235/60 P |
| 3,306,535 | 2/1967 | Wagemann | 235/61 PH X |
| 3,348,770 | 10/1967 | Kondur, Jr. | 235/61 PG |
| 3,652,826 | 3/1972 | Chekroun et al. | 235/61 PG X |
| 3,858,035 | 12/1974 | Englund | 235/61 PG X |
| 3,929,276 | 12/1975 | Lundström et al. | 235/60 P X |

Primary Examiner—Stanley J. Witkowski
Assistant Examiner—Stanley J. Witkowski
Attorney, Agent, or Firm—McGlew and Tuttle

[57] ABSTRACT

A device for transmitting information in the form of an electrical signal to at least one mechanism for giving a readout of the information, comprises a readout mechanism which has at least one symbol wheel which carries symbols on its circumference. A plurality of angularly spaced and radially extending actuating members are affixed to a drive shaft which rotates to move the actuating members in a first plane. The actuating members are divertible into a second plane parallel to the first plane by a switch arranged in the plane of movement of the actuators so as to selectively divert the actuating members into a second plane. The actuating members have individual symbols corresponding to the number of readout symbols and guide walls are provided for supporting the actuators and the switch, as well as a gear drive for a symbol wheel in the respective first and second planes. A relay is employed for sensing the symbol position of the symbol wheel and it is connected to the switch to energize the switch. Gear means are located in respective first and second planes in a position to be engaged by the actuating members upon rotation of the drive shaft in order to cause rotation and indexing of the symbol wheel.

8 Claims, 3 Drawing Figures

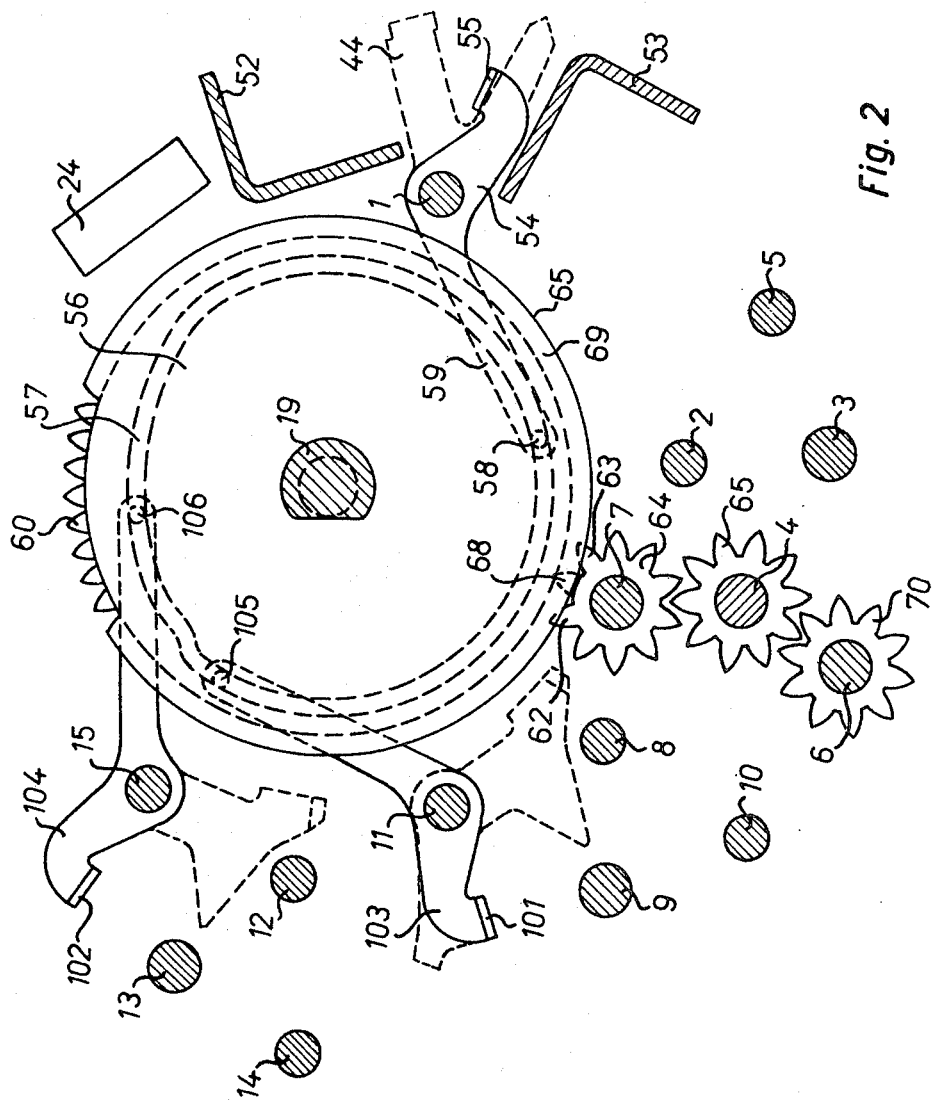
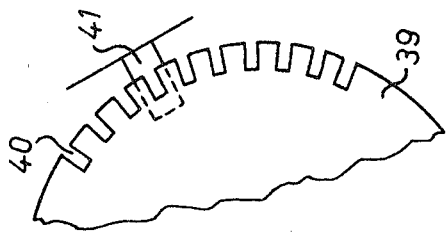
Fig. 2
Fig. 3

DEVICE FOR TRANSMITTING INFORMATION IN THE FORM OF ELECTRICAL SIGNALS TO AT LEAST ONE MECHANISM FOR DISPLAYING OR PRINTING THIS INFORMATION

FIELD AND BACKGROUND OF THE INVENTION

This invention relates in general to information-transmitting devices and, in particular, to a new and useful device for transmitting information in the form of electrical signals to at least one mechanism for displaying or printing this information.

DESCRIPTION OF THE PRIOR ART

The present invention relates to devices for transmitting information in the form of electrical signals to at least one mechanism for displaying or printing this information. Such display or printing mechanism comprises at least one wheel carrying the symbols in the form of reading or printing characters on its circumference and connected to a gear for being rotated into its display or printing position.

Such a device is provided, for example, in electronic calculating machines which are coupled to a printer, for example, of the results of calculation. The present invention is directed to a device of the kind mentioned above which, as compared to the prior art, is substantially simpler in design, comprises less component parts, has a substantially smaller overall size and, in addition, is particularly reliable in operation.

SUMMARY OF THE INVENTION

In accordance with the invention, there are provided actuating members which are positioned in spaced relationship one after the other in a first plane, and which are drivable in this plane and divertible laterally into a second plane parallel from the first one, and which are provided in a number corresponding to the number of symbols necessary for the display or printing. The first and second planes are separated from each other along a part of the motion path of the actuating members by a guide wall and a gear is connected to a symbol wheel which is situated in one of said two planes so that the actuating members, while driven and moving in this plane, engage the gear thereby indexing the symbol wheel. The apparatus includes a switch for selectively diverting the actuating members into the second plane. The switch is mounted, considered in the motion direction of the actuating members, at the beginning of the guide wall and is actuable through a relay which is energized upon sensing of the symbol position on a reference member moved in synchronism with the actuating members.

In a particularly advantageous embodiment of the invention, at least one adding mechanism including a carry mechanism is provided, located in respect to the motion direction of the actuating members, after the display or printing mechanism, with the input wheel of the adding mechanism being situated in the same as the input wheel of the display or printing mechanism so that the adding mechanism is actuated by the same actuating members as the display or printing mechanism. In consequence, provided the guide wall extending along a part of the motion path of the actuating members is not interrupted between the display or printing mechanism and the adding mechanism, the display or printing mechanism and the adding mechanism are positively coupled to each other, which leads to numerous advantageous possibilities of application of the device, for example, in franking machines, charge-stamping machines, cash registers, weighing equipment, automatic devices for dispensing value stamps, etc., where an adding mechanism is inaccessible from the outside of the machine for the entered values or used value units and is required to securely prevent fraud.

The positive transfer of the amount, value units, or the like, entered into the display or printing mechanism to the adding or summing mechanism has further the advantage, in comparison with machines comprising an electronic storage or summing equipment, that the total cannot be cleared, for example, by a power failure.

Depending on the application of the invention device in each case, various printing or reading characters may be provided on the circumference of the symbol wheel or wheels. In most cases, such as in franking machines, charge-stamping machines, cash registers, weighing equipment, etc., only the figures 1 to 9 and 0 are needed on each symbol wheel, as well as a number of symbol wheels corresponding to the desired number of decimal places to be read or printed, or corresponding to the number of decimals which are needed in the adding mechanism provided. If the device is used in a weighing equipment, the numbers correspond to weight units, such as gram or kilogram, while in franking machines, charge-stamping machines, cash registers or dispensers of post-stamp-like value stamps, they correspond to monetary units, and in labelling equipment, for example, to the number of pieces.

Thus, the information to be transmitted in the form of electrical signals by the inventive device to a display or printing mechanism corresponds, in the examples of application mentioned, to amounts of charge, weight, to the number of pieces, etc., and the corresponding electric signals may be delivered in the usual manner, for example, in the form of electrical impulses corresponding each to a definite alphanumeric character of the symbol wheels.

The reference member moving in synchronism with the actuating members for the symbol wheels and on which the actual positions of the symbols are sensed, comprises, for example, a rotatable circular disc provided with cutouts or holes the number of which correspond to the number of symbols on a symbol wheel or, as the case may be, is smaller by one. The reference member may be sensed photoelectrically so that during its synchronous motion with the actuating members, a number of electrical pulses are received in the photoelectric sensing device corresponding to the number of cutouts or holes which have passed therealong. This number of pulses may then be compared, in an electronic input device, with a number of pulses corresponding to the information to be displayed or printed and, in case of conformity, the energizing of the relay actuating the switch for the actuating members can be released, so that the actuating members diverted by the switch or the non-diverted actuating members turn the respective symbol wheel from a zero position into a position corresponding to the information entered into the electronic input device.

The information may be introduced into the electronic input equipment, in accordance with the application in each case, through a decimal keyboard, a coin collector, batch counter of a scale, or, in special cases, also through an alphanumeric keyboard corresponding to a typewriter keyboard. While using the device with a typewriter, all of the required alphanumeric characters, for example, 88, are to be provided on the circumference of the symbol wheel. Such a typewriter, in addition to the printing mechanism, may be provided in a simple manner with a display mechanism by which, prior to the printing, one or more characters in accordance with the number of symbol wheels used can be made visible. Since the information introduced is transmitted in the form of electrical signals, the electronic input equipment can be located separately from the inventive device and may advantageously be used, at the same time, for a teletypewriter.

Further, the device in accordance with the invention makes it possible to design the carry mechanism of an adder in a new manner.

The various features of novelty which characterize the invention are pointed out with particularly in the claims annexed to and forming a part of this disclosure. For a better understanding of the invention, its operating advantages and specific objects attained by its uses, reference should be had to the accompanying drawing and descriptive matter in which there is illustrated a preferredd embodiment of the invention.

BRIEF DESCRIPTION OF THE DRAWINGS

In the Drawings:

FIG. 2 is a sectional view similar to FIG. 1 taken in a plane parallel to the plane of FIG. 1 but spaced from the first drawing plane; and FIG. 3 is a partial side elevational view of the reference wheel.

DESCRIPTION OF THE PREFERRED EMBODIMENT

Figure 1:
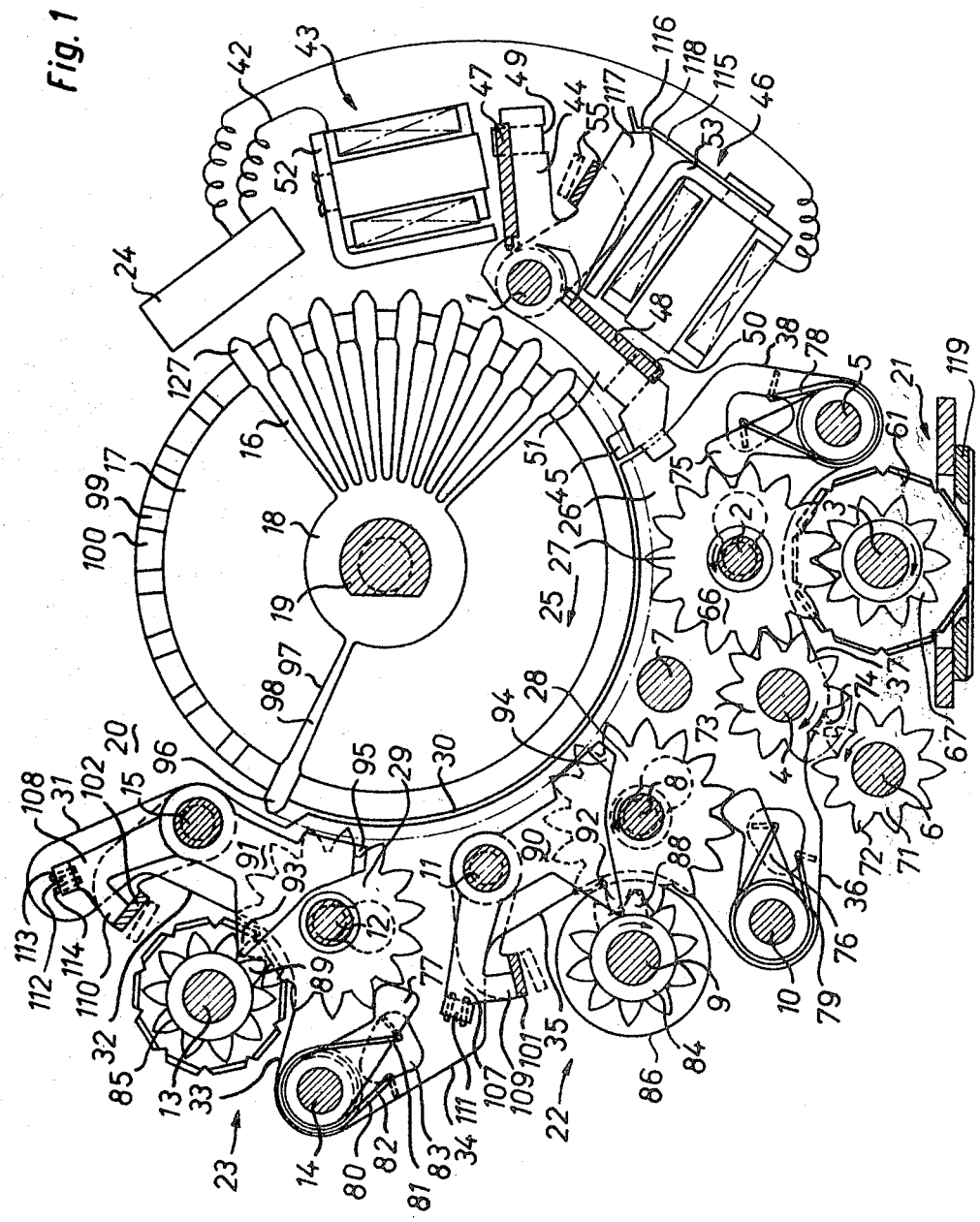
FIG. 1 is a somewhat schematic sectional view of a device suitable for a franking machine employed for transmitting information in the form of an electrical signal as constructed in accordance with the invention.

Referring to the drawings in particular, the invention embodied therein, comprises a device for transmitting information in the form of an electrical signal to at least one mechanism for giving a readout of the information. FIG. 1 shows the substantial parts of the device necessary for a single symbol wheel or a single place digit. Corresponding to the number of the symbol wheels juxtaposed in parallel or of the decimal places to be displayed or printed, a plurality of equally spaced parallel sectional views of the device could be shown similar to that of FIG. 1. The device comprises numerous gears and levers which are mounted in parallel to one another on the same shafts designated 1 through 15 in FIGS. 1 and 2. The central part of the device is a wheel carrying actuating members 16 and comprising a guide disc 17 for the actuating members 16 and a circular disc 18 supporting the actuating members. Both discs 17 and 18 are mounted on a drive shaft 19 and are secured against rotation thereon. The plurality of shafts 1 to 15 is fixedly mounted, by their two extremities (not shown), in two mutually parallel housing walls 20. Drive shaft 19 for guide disc 17 and circular disc 18, carrying actuating members 16, extends through side walls 20 and is mounted thereon for rotation. The outer contour of one of the side walls visible in FIG. 1 is not indicated since it is to be adapted to the use of the inventive device in each case.

The device shown in the sectional view of FIG. 1 is, for example, a part of a franking machine and comprises a printing mechanism, generally designated 21, and two adding mechanisms generally designated 22 and 23. One adding or summing mechanism 22 serves to the reading of the total amount and the other adding mechanism 23 serves to the printing of the same total amount as it comprises a printing equipment. As will be described in more detail hereinafter, the arrangement shown necessarily results in an additon in adding mechanisms 22 and 23 of any amount which has been introduced into printing mechanism 21, as required, for example, in franking machines.

The amount to be franked is introduced, for example, through a usual decimal keyboard (not shown) into a diagrammatically indicated electronic device 24 or, if the inventive device is used for printing value stamps, for example, through a coin collector. The electronic device 24 may be provided with an electronic check display for the amount entered as is usual, for example, in electronic calculators. Thereupon, through an electromotor with transmission (not shown), or by hand, drive shaft 19 and, thereby, circular disc 18 with actuating members 16 is turned in the direction of arrow 25. If, for example, the amount 3 has been entered into electronic device 24, either the first three or the last three of the nine actuating members 16 move, in accordance with the illustration in FIG. 1, in front of and past a guide wall 26 which extends along the circular path of the actuating end portions 127 of actuating members 16 and, at a small distance, along a part of the circumference of guide disc 17 at least up to the second adding mechanism 23 without interruption. This guide wall 26 also extends in parallel to further guide walls 26 (not shown) so that gears 27, 28 and 29 of printing mechanism 21 and adding mechanisms 22 and 23, driven by actuating members 16 and intended for a single decimal place, are in each case enclosed between two guide walls 26. The outline of the guide wall shown in FIG. 1 is indicated by the reference numerals 30 through 38.

The first or last three actuating members moving past and in front of the arcuate portion of guide wall 26 corresponding to outline portiion 30 engage in gear 27 driving the printing mechanism 21 and also in gears 28, 29 of the adding mechanisms. The motion of actuating members 16 or their angular position is sensed on a reference disc 39 (FIG. 3) which is secured to drive shaft 19, for example, outside the housing wall 20. For this purpose, as shown in FIG. 3, reference disc 39 is provided on its periphery with 10 cutouts 40 which move through a light barrier 41 wherefrom electrical signals are delivered to the electronic device 24. These signals are electronically compared with the input of device 24 and as soon as, with the introduced numerical value of 3, the third or sixth cutout 40 reaches the sensing point 41, electronic device 24 delivers, through an electrical line 42, an energizing current to a relay 43 by which an angular, flat, switch lever 44 is pivoted so that the lever portion 45 acting as a switch is pivoted out of the circular path along which the actuating end portions 127 of actuating members 16 move. In accordance with the entered value of 3, three actuating members are deviated into a path extending in front of the guide wall so that they index each of the gears 27, 28 and 29 by three teeth. The actuating members are diverted by switch 45 against the action of a spring which is effective perpendicularly to guide wall 26 so that, after switch 45 is pivoted back, actuating members continue to move along the back side of guide wall 26 and cannot further engage gears 27 to 29. For a numeric value of zero, all of the nine actuating end portions 127 of the actuating members move past the back side of guide wall 26, i.e., relay 43 is energized during the entire adjusting cycle. For adjusting the numeric value 9, switch lever 44 remains in the position shown in FIG. 1 so that the actuating end portion 127 of all of the actuating members 16 move along the front side of guide wall 26, i.e., in the plane in which gears 27 and 29 of the printing mechanism are located.

The numerous levers and gears of the device are made, for example, of plastics and, consequently, an iron element 47 or 48 is provided on the respective arm of switch lever 44 to be attracted by relay 43 or 46, and is secured thereto, for example, by means of a clamp 49, 50. Since the width of a relay suitable for actuating switch lever 44 is greater than the distance between two guide walls 26, the relays 46 which serve to the actuation of the neighboring switch levers 44 are offset in the circumferential direction of guide disc 17 relative to relay 43. Relays 46 act analogously on an arm 51 extending tangentially to guide disc 17 and carrying switch 45 on its end portion. Relays 43 and 46 are each secured to an angle support 52 and 53, respectively, which supports connect the two parallel side walls 20 of the device to each other.

At least one angle lever 54 is mounted on the same shaft 1 on which the switch levers 44 are pivotally mounted, and is intended for displacing a bar 55 which extends parallel to shafts 1 through 15 and perpendicularly to switch levers 44. As soon as actuating end portions 127 of all of the actuating members 16 have passed the switch 45 or the near edge of guide wall 26, bar 55 swings the switch levers 44 back into their initial position shown in FIG. 1. The pivotal movement of angle lever 54 is controlled by a wheel disc 56 which is secured to drive shaft 19 close to the side wall 20 of the device. For this purpose, a control groove 57 is provided on the inside, i.e., the side facing the printing or adding mechanisms, of wheel disc 56, and a slide pin 58, secured to the end of one arm 59 of angle lever 54, engages the groove 57. In accordance with the changing distance of groove 57 in the circumferential direction from the center of rotation of wheel disc 56 and the changing angular position of the wheel disc, angle lever 54 is pivoted and, thereby, through bar 55, switch lever 44 is also pivoted. In FIG. 2, angle lever 44 is indicated in dotted lines and in this position indicated in FIG. 2, bar 55 pushes the switch lever into its position shown in FIG. 1. This position is reached as soon as the upper part of control groove 57, according to the position shown in FIG. 2, comes into the location where slide pin 58 is indicated. Thereupon, bar 55 return into the position indicated in FIG. 1 in dotted lines, in which, switch lever 44 is pivotable by means of relay 43.

One portion of the circumference of wheel disc 56 is provided with gear teeth 60, in the number of ten. These ten teeth 60 serve to drive a resetting mechanism for resetting the printing cylinder 61 mounted on shaft 3 into its zero position in which the figure 0 is in the position ready for printing, in accordance with the showing in FIG. 1. In the angular position of wheel disc 56 shown in FIG. 2, the teeth 62, 63 of a gear 64 rest against the outer circumference 65 of wheel disc 56 so that, thereby, gear 64 is blocked and, consequently, gears 65, 70 and 71 are also blocked.

To enable teeth 62 and 63 of gear 64 to rest against the circumference of wheel disc 56, one tooth, i.e., tooth 68, of gear 64 is cut off in a width corresponding to the width of the circumferential rim 69 of wheel disc 56 as indicated in FIG. 2. Gear 65 has only to transmit the rotary motion of driven gear 64 to a further gear 70. Gear 70 is positively driven off gear 64 as soon as the latter is rotated by teeth 60, and at each revolution of wheel disc 56, through 360°. Gear 70 is rigidly and coaxially connected to further gears 71 corresponding in number to the number of figure wheels 61 of the printing cylinder.

As long as the figure wheel 61, which is operationally connected to one of gears 71, is in its zero position shown in FIG. 1, teeth 72 of gear 71 move through a gap provided between the teeth of freely rotatable gears 73 which are mounted on the same shaft 4 as gear 65, and which however, are not driven by the latter. To form the previously mentioned gap, one tooth 74 of gear 73 is partly cut off so that teeth 72 of gear 71 can move freely through the gap thus formed. However, after figure wheel 61 has been rotated by gear 66 which is driven by actuating members 16 from its zero position into a position in which another figure than zero is ready for printing, i.e., with this other figure in the lowermost position according to FIG. 1, gear 73 is also turned through the same angle of rotation and the aforementioned tooth gap is no longer in its position shown in FIG. 1. A rotation of gear 73 during the adjustment of figure wheel 61 is made possible by a tooth gap of gear 71 which gap is in the position shown in FIG. 1 as long as teeth 60 of the wheel disc are not engaged with gear 64. Consequently, if due to the turning of the figure wheel, the tooth gap of gear 73 provided adjacent tooth 74 is not opposite to gear 71, teeth 72 can engage gear 73 and rotate it until the tooth gap again comes into the position facing gear 71. In this manner, each time teeth 60 mesh with gear 64, gear 71 drives the gear 73 and, thereby, gears 66 and 67 along with figure wheel 61, back into the zero position so that a new amount can be transmitted to figure wheels 61 for printing.

Each of the gears 27, 28 and 29 driven by actuating members 16, has a locking pawl 75, 76 and 77, respectively, applied thereto, which blocks the gears in both directions against unintentional rotation. Locking pawls 75 to 77 are pivotally mounted, by one end on pivots 5, 10 and 14 and are resiliently pressed against the respective gear by means of helical springs 78, 79 or 80 in a manner such that one end 81 of the spring applies against the pawl and the other end 82 of the spring engages into a cutout 83 provided in guide wall 26, as is shown on pawl 77, for example.

Each of the adding mechanisms 22, 23 of which the first one is intended only for the reading of the total amount and the second one only for the printing of this total amount, substantially comprises the gear 28, 29 driven by actuating members 16 and a second gear 84, 85 which is firmly connected to a reading wheel 86 or printing wheel 87 with which, consequently, it turns conjointly about shaft 9 or 13. It is understandable from FIG. 1 that the same actuating end portions 127 of actuating members 16 which, shortly before, have driven gear 66 associated with the printing mechanism 21, subsequently necessarily drive gears 28 and 29, because they are guided along the portion 30 of guide wall 26 and, thereby, are positively guided in the plane in which these driven gears are located. Adding mechanisms 22 and 23 are similar in their design with printing mechanism 21. There is a difference, however, in that no resetting mechanism is provided, of course, since the amounts entered must be continuously added. In place thereof, a carry mechanism is provided, i.e., a mechanism which, upon exceeding the numerical value of 9, or upon one revolution of the reading or printing wheel 86, 87, indexes the next reading or printing wheel provided in a second plane for the next decimal place, through one figure. To this end, a single tooth 88, 89 is provided in a slightly offset plane on the same wheel body carrying the reading or printing wheel 86, 87 and the gear 84, 85. In the same plane, a lever plate 90, 91 is mounted for pivotal movement about a pivot 11, 15. Tooth 88, 89 and, consequently, also lever plate 90, 91 may be provided at the other side of reading or printing wheel 86, 87, in opposition to gear 84, 85. After one full revolution of reading or printing wheel 86, 87, clockwise in the showing of FIG. 1, tooth 88, 89 revolving along in the circumferential direction applies against a nose 92, 93 of lever plate 90, 91 so that, a switch portion 94, 95 provided on place 90, 91, is pivoted into the circular path along which, at each revolution of disc 18 carrying the actuating members 16 or of guide disc 17, the actuating end portion 96 of a carry actuating member 97 is moved. This carry actuating member 97 forms a part of circular disc 18 carrying the actuating members 16 and extends, in the same manner as the actuating members 16, radially to circular disc 18. The actuating end portion 96 of carry actuating member 97, however, is positioned in a plane which is offset relative to the plane of actuating members 16 in the axial direction so that it moves in the circular path shown in FIG. 1 along the front side of guide wall 26 even during the periods in which the switch 45 for actuating members 16 is shifted out of this circular path. Like the actuating members 16, the carry actuating member 97 also comprises a relatively narrow resilient shank 98 and an enlarged end portion which is guided laterally in the circumferential direction in cutouts 99 having a U-shape cross-section and provided on the periphery of guide disc 17. Cutouts 99 for guiding and supporting the end portions of members 16 and 97 are provided in a rim 100 projecting in an axial direction from the plane of guide disc 17.

As soon as actuating end portion 96 of carry actuating member 97, during its motion along the circular path, comes into contact with the switch portion 94, 95 of lever plate 90, 91 which has been pivoted into the circular path, member 96 slides over the inclined surface are of the lever plate acting as a switch 94 and is deviated into a plane which is parallel to the circular path and in which a gear 28' corresponding to gear 28 is located. Gear 28 drives the figure wheel 86, 87 of the next decimal place. In the same manner, this next figure wheel 86', 87' is also associated with a carry tooth 88', 89' for effecting the carry for the next decimal place, through a level plate 90', 91'. As previously mentioned, it is to be understood that the device comprises arrangements such as shown in FIG. 1 juxtaposed in a plurality of mutually parallel planes. Thus, the drive wheel 28', 29', not visible in FIG. 1, of the adjacent decimal place of adding mechanisms 22, 23 can be indexed, with the aid of switch 94, 95, through one tooth by the carry actuating member 97 and, in addition, also by actuating members 16' for the direct adjustment of the next decimal place on a printing wheel 61' and the corresponding reading and printing wheel 86', 87' associated with this decimal place. In order to ensure that after the deviation of the carry actuating member 97 by switch 94, the circular path along guide wall 26 is cleared again for the actuating members 16, shown in FIG. 1, each lever plate 90, 91, as well as the lever plates 90', 91', etc. parallel thereto, is associated with a resetting bar 101, 102 extending in an axial direction through the device and secured, at one or both of its ends, to a lever 103, 104 for pivotal movement therewith. In accordance with the showingin FIG. 2, lever 103, 104 of each of the adding mechanisms 22 and 23 is pivoted in the same manner as already described in connection with resetting bar 55 for angle levers 44, 44' etc., i.e., lever 103, 104 is mounted for swinging about a pivot 11, 15, the resetting bars 101, 102 being secured to one arm of the lever. At the end of the other lever arm, a guide pin 105, 106 is provided which engages the same control groove 57 as slide pin 58 of lever 54.

As the lever plates 90, 90', etc. are being reset during each revolution of discs 17, 18 and actuating members 16, resetting bar 101, 102 applies against a hook-shape portion 109, 110 projecting from an arm 107, 108 of lever plate 90, 91 so that the lever plate is swung about pivot 11, 15. Both possible pivotal positions of lever plate 90, 91 are secured against unintentional turning of the lever plate. For this purpose, a nose projecting in axial direction toward guide wall 26 is provided on the external end 111, 112 of arm 107, 108 and two mutually spaced recesses 113, 114 into which the nose alternately engages in a springy manner are provided in guide wall 26. The springy engagement is ensured by making the arm 107, 108 of lever plate 90, 91 laterally elastic, i.e., flexible in the axial direction. Under the action of roce of the pivotal movement released by tooth 88, 89 or resetting bar 101, 102, the nose (not visible in FIG. 1) is drawn out of one of the recesses 113, 114 and, on completion of the pivotal movement, engages the other recess 113, 114.

Angle levers 44, 44' are also secured in their two pivotal positions against unintentional motion, to which end, a spring tongue 115 is secured to support 53 of relay 46. Tongue 115 has a hook-like bent end portion 116 resting against the V-shape end of a third arm 117 of angle lever 44. Depending on the pivotal position of angle lever 44 or the position of switch 45 for actuating members 16, the hook-like end portion 116 of the spring tongue applies against one or the other face of the V-shape end of third arm 117. During pivoting of one of the angle levers 44, 44', etc. effected either by a relay 43 or 46 in the one direction or by the resetting bar 55 acting against the third arm 117 in the other direction, the hook-like end portion 116 of spring tongue 115 slides over the apex 118 of the V-shape end of the third arm 117. In this manner, all of the gears and levers of the device are secured against an unintentional turning either by spring tongues 115, or by spring-loaded pawls 75 or recesses 113, 114 for a springy engagement of a nose.

As already mentioned, the inventive device can be used in numerous machines of various kinds and it is to be understood that the embodiment described by way of example with reference to the drawings may be varied in accordance with the respective application. For example, it is unessential in what angular position the adding mechanism or mechanisms are mounted relative to the drive shaft 19 or to the at least one guide wheel 17. However, for a combination of a printing mechanism with at least one adding mechanism, it is necessary to provide the driven gears 28, 29 and the driven gear 27 of printing mechanism 21 in the same circular path which is continuously limited by the guide wall 26. It it also evident that the adding mechanism 23 comprising a printing equipment may directly follow the printing mechanism 21. For feeding or supporting an ink ribbon used for printing and for feeding the printing material, conventional constructions may be combined with the inventive device. In FIG. 1, a stereotype plate 119 is indicated which is used with the printing mechanism 21 in cases where the inventive device is mounted in a franking machine and the pattern of which is stamped, for example, on a letter cover along with the amount adjusted in the printing mechanism. In the same manner, such a printing unit may be used for printing value stamps which are a substitute for usual postage stamps. From the foregoing description, it becomes understandable that all of the franking values printed by the printing mechanism 21 are summed up in the adding mechanism 22 and 23, so that after a certain period of time, the used value units can be carried to account. The impression of the totals in the adding mechanism provided with printing wheels 87, of course, facilitates the accounting. The inventive device may also be designed so that upon reaching a predetermined total, the mechanisms are blocked. This may be effected, through an appropriate further mechanism (not shown), by means of a tooth provided on the respective figure wheel and corresponding to a tooth 88 or 89.

While a specific embodiment of the invention has been shown and described in detail to illustrate the application of the principles of the invention, it will be understood that the invention may be embodied otherwise without departing from such principles.

What is claimed is:

1. A device for transmitting information in the form of an electrical signal to at least one mechanism for giving a readout of information, comprising a readout mechanism having at least one symbol wheel carrying symbols on its circumference, first gear means connected to said symbol wheel to drive said symbol wheel to rotate it to a readout position, a drive shaft, a plurality of angularly spaced radially extending actuating members affixed to said drive shaft for rotation therewith and arranged in a first plane, said actuating members being divertible into a different second plane parallel to said first plane, said actuating members being of a number corresponding to the number of readout symbols, guide wall means separating said first and second planes, said first gear means being situated in one of said first and second planes in a position to be engaged by said actuating members upon rotation of said drive shaft to cause rotation of said gear means and indexing of said symbol wheel, a switch arranged in the path of said actuating members so as to selectively divert said actuating members into the second plane, and a relay for sensing the symbol positions of a symbol on said symbol wheel and connnected to said switch to energize said switch.

2. A device according to claim 1, including a printing mechanism arranged about the path of movement of said actuating members, at least one adding mechanism arranged in the direction of motion after said printing mechanism, said adding mechanism including a carry mechanism, said first gear means including a first drive gear driving said symbol wheel of said printing mechanism, second drive gear for said adding mechanism and a third drive gear for said carry mechanism all arranged in said first plane in a portion to be actuated upon by said actuating members.

3. A device according to claim 2, wherein said guide wall extends along a part of the motion path of the actuating member between said printing mechanism and said adding mechanism without interruption.

4. A device according to claim 1, including a circular disc, said actuating members extending radially outwardly from said circular disc, said disc being mounted on said drive shaft for rotation therewith, said actuating members comprising bar-shape arms made in a single piece with said disc.

5. A device according to claim 4, including a guide and supporting wheel for said actuating members secured to said drive shaft at a location adjacent said disc.

6. A device according to claim 1, including a circular disc secured to said drive shaft and provided with cutouts corresponding in number to the number of said symbols.

7. A device according to claim 6, including means for sensing said cutouts and delivering impulses corresponding to the number of said cutouts, an electrical device connected to said sensor for receiving said impulses and for comparing with an input information and having means for delivering an energizing current to said relay.

8. A device according to claim 1, including a decimal carry actuating member for the tens transfer of at least one adding mechanism driven by said shaft and having an actuating portion which is movable along a circular path extending parallel to and off of the two possible mutually parallel circular paths of said actuators, a switch pivotal into said circular path of said actuating portion whereby the actuating portion of the carry actuating member is moved along with a part of its circular path into a plane in which the drive gear for the figure wheel of the next higher decimal place is situated.

* * * * *